UNITED STATES PATENT OFFICE.

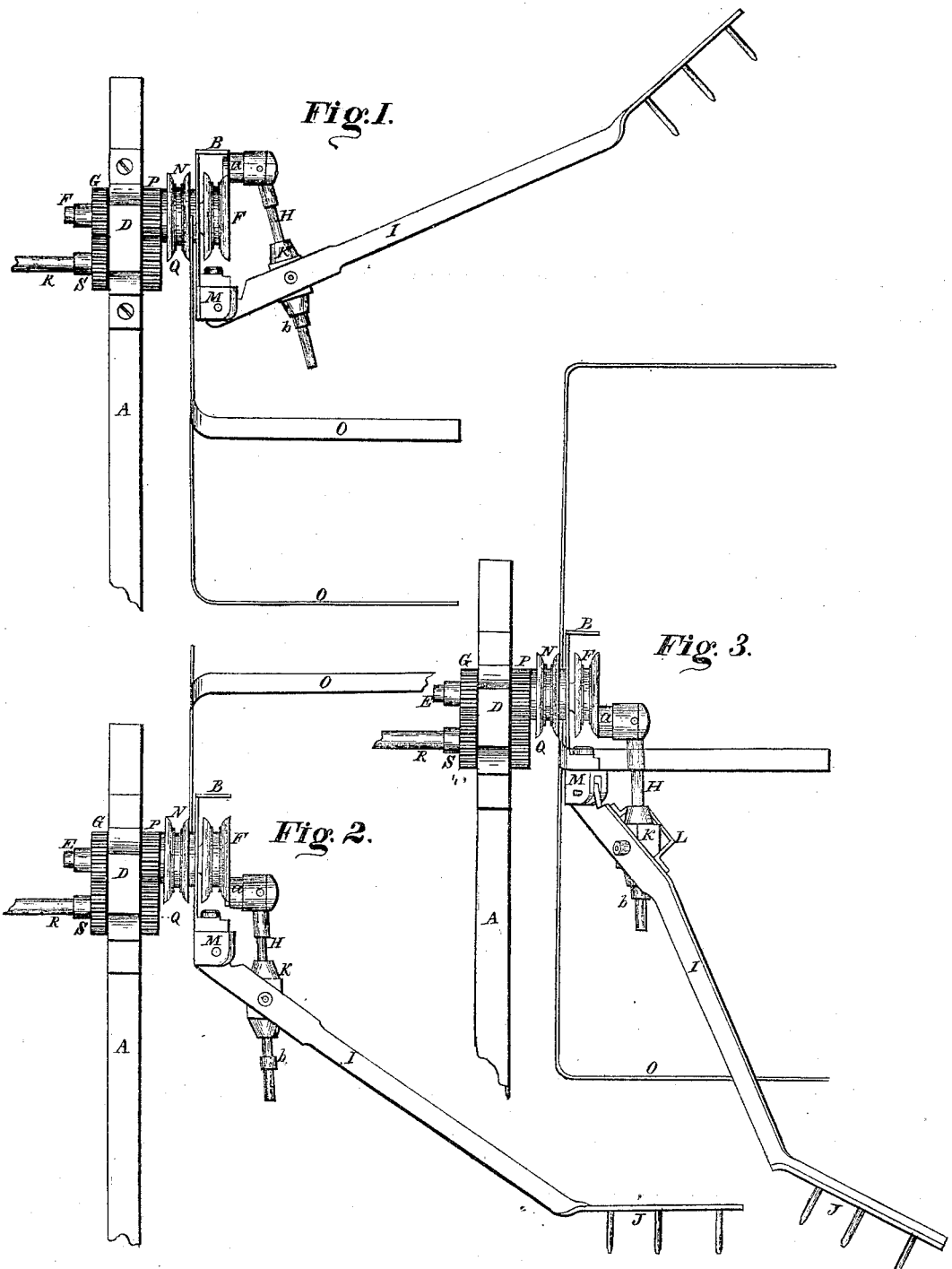

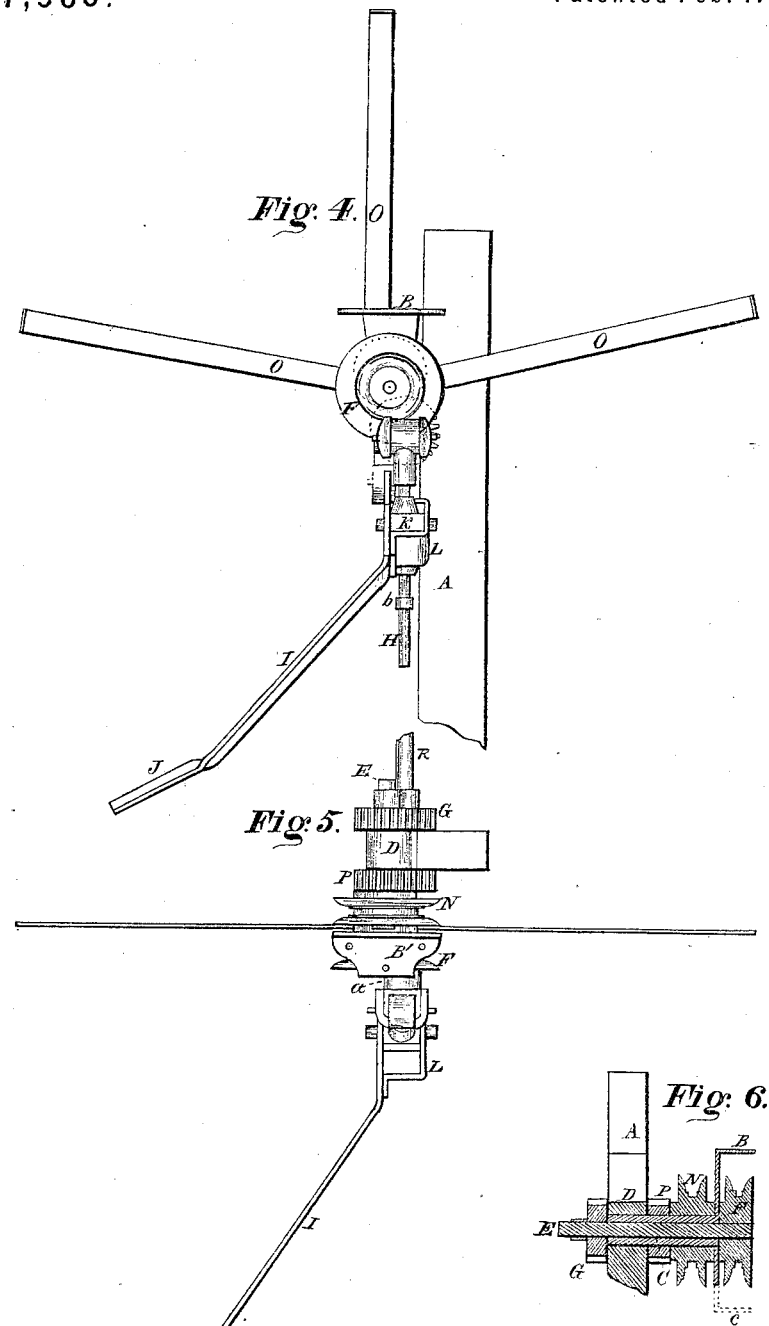

ANDREW WEMPLE, OF CHICAGO, ILLINOIS, ASSIGNOR OF ONE-HALF HIS RIGHT TO CHARLES COLAHAN, OF SAME PLACE.

IMPROVEMENT IN HARVESTER-RAKES.

Specification forming part of Letters Patent No. 147,583, dated February 17, 1874; application filed January 21, 1874.

*To all whom it may concern:*

Be it known that I, ANDREW WEMPLE, of Chicago, in the county of Cook and State of Illinois, have invented a certain new and Improved Raking Attachment for Harvesters; and I do hereby declare that the following is a full, clear, and complete description thereof, reference being had to the accompainying drawings making part of the same.

Figures 1, 2, and 3 are side views of the attachment. Fig. 4 is a front view. Fig. 5 is a plan view. Fig. 6 is a detached section.

Like letters of reference refer to like parts in the several views.

This invention relates to a raking attachment for harvesters, operated automatically by the mechanism of the machine, whereby the grain is removed from the platform to the rear of the machine for binding; and it consists in the construction and combination of parts hereinafter described and claimed.

A represents the reel-post of a harvesting-machine, to which is secured a bracket, B, by means of a sleeve, C, Fig. 6. The end of the sleeve is fitted rigidly in the stay D. In the sleeve referred to is fitted and revolves a shaft, E, carrying on one end a crank-wheel, F, operated by a pinion, G, secured to the opposite end of the shaft, as shown in Fig. 6. To the pin $a$ of the crank-wheel is hinged a rod, H. To said rod is attached the arm I of the rake J, by passing the rod loosely through a head, K, pivoted to the arm I by means of the stay L, whereby the arm is actuated for raking the grain from the platform, as will presently be shown. M is a lug or knee pivoted in the end of the bracket B, to which is hinged the end of the rake-arm I. N is a grooved pulley fitted to the sleeve C, on which it revolves. Through this pulley power is applied to drive the reel and rake. To the pulley is attached the reel O; also to said pulley is secured a pinion, P, made to engage a pinion, Q, on the shaft R, whereby the reel and pulley are operated, and the crank-wheel F by the engagement of the pinion S with the pinion G. By this arrangement and combination of pinions the crank-wheel F, for operating the rake, moves independently of the pulley N and reel, but which, however, operate conjointly for reeling and raking the grain from the platform.

The practical operation of the above-described raking attachment is as follows: The position of the rake, as shown in Fig. 2, is such as when it is down on a line with the cutter-bar and about to rake the grain therefrom. Now, as the crank-wheel is made to revolve in consequence of the pinions G S, actuated by the gearing of the machine to which the raking attachment is applied, the rake-arm I and rake are carried around and back over the platform to the rear edge thereof, from which the grain falls onto the ground. The position of the rake on arriving at the edge of the platform is as shown in Fig. 3, or about such position. From this point the rake is immediately elevated, as shown in Fig. 1, to be carried forward over the platform to the front edge thereof, from which it was moved (its first position) by the continued revolution of the crank-wheel. The wrist-pin $a$ of the wheel draws upward the rod H, and consequently the arm and rake, by its connection therewith by the intervention of the head K, and the adjustable collar $b$ on the rod. From its elevated position the rake is dropped by the continued rotation of the crank-wheel, which permits the rod H to descend, and therewith the arm I and rake to its first position. By this time sufficient grain has fallen upon the platform for another bundle, which is raked off, as before, by the backward movement of the rake, caused by the continued revolution of the crank-wheel and wrist-pin.

The operation of the reel conjointly with the rake is effected by the pinion Q, in combination with the pinion P. The movement of the reel in its relation to that of the rake is such as to gather the grain upon the platform in time for the rake to remove it without interfering with each other.

The raking attachment above described is shown as being attached to the reel-post of a machine. This, in some machines, may be the most desirable position, whereas in others it might be necessary or expedient to attach it to the top of the machine. This can be easily done by inverting the position of the attachment, and standing it upon the broad plate or end B', Fig. 5, of the bracket and bolting it down thereto. When this is done the reel is removed from the sleeve, and an ordinary reel may be used instead. This inversion of the attachment is indicated by the dotted lines c, Fig. 6, the essential operation of which will be the same as that above described.

What I claim as my invention, and desire to secure by Letters Patent, is—

1. The combination of the crank-wheel F, rod H, and rake-arm I, with the pivoted lug M, and stationary bracket B, supported on sleeve C, as and for the purpose set forth.

2. The combination of the sleeve C, the stationary rake-supporting bracket B, pulley N, and reel O, with the gearing for driving the rake, as and for the purpose set forth.

3. The sleeve C, around which the reel revolves, the stationary bracket B rigidly attached to the sleeve, and the rake-arm I pivoted in the bracket, these parts being combined substantially as and for the purpose set forth.

ANDREW WEMPLE.

Witnesses:
J. H. BURRIDGE,
R. M. WHITE.